United States Patent [19]
Marik et al.

[11] Patent Number: 5,915,736
[45] Date of Patent: Jun. 29, 1999

[54] INTEGRALLY FORMED WHIP ASSEMBLY FOR ELECTRICALLY INTERCONNECTING ELECTRICAL APPLIANCES TO A POWER SOURCE

[75] Inventors: Gregory C. Marik, Germantown; Claude J. Bauer, Greenbrier, both of Tenn.

[73] Assignee: Thomas & Betts International, Inc., Sparks, Nev.

[21] Appl. No.: 08/896,902

[22] Filed: Jul. 18, 1997

[51] Int. Cl.$^6$ ............................. F16L 41/00; H02G 15/20
[52] U.S. Cl. ...................... 285/21.3; 285/903; 285/423; 285/139.2; 285/149.1; 285/151.1; 174/65 SS; 138/121; 138/134
[58] Field of Search .................................... 285/423, 903, 285/220, 204, 139.1, 139.2, 149.1–154.4, FOR 143, 21.3; 174/65 SS; 138/121, 134, 150

[56] References Cited

U.S. PATENT DOCUMENTS

| | | | |
|---|---|---|---|
| 2,933,428 | 4/1960 | Mueller | 154/116 |
| 3,264,013 | 8/1966 | Richardson et al. | 285/22 |
| 3,633,943 | 1/1972 | Ramm et al. | 285/22 |
| 4,179,142 | 12/1979 | Schopp | 285/239 |
| 4,196,755 | 4/1980 | Kutnyak | 138/150 |
| 4,248,459 | 2/1981 | Pate et al. | 285/903 |
| 4,250,348 | 2/1981 | Kitagawa | 174/65 SS |
| 4,428,602 | 1/1984 | Lambot et al. | 285/239 |
| 4,440,425 | 4/1984 | Pate et al. | 285/903 |
| 4,544,800 | 10/1985 | Katsuura | 285/151.1 |
| 4,679,827 | 7/1987 | Law | 285/158 |
| 4,711,974 | 12/1987 | Borsh | 285/903 |
| 4,779,902 | 10/1988 | Lee | 285/260 |
| 4,829,145 | 5/1989 | Mitchell | 285/903 |
| 4,842,548 | 6/1989 | Bolante | 174/65 SS |
| 4,850,620 | 7/1989 | Puls | 285/174 |
| 4,864,080 | 9/1989 | Fochler et al. | 285/903 |
| 5,054,824 | 10/1991 | Wyss | 285/369 |
| 5,072,072 | 12/1991 | Bawa et al. | 285/151.1 |
| 5,087,084 | 2/1992 | Gerring | 285/319 |
| 5,370,426 | 12/1994 | Meyers | 285/237 |
| 5,390,704 | 2/1995 | Kanao | 138/121 |
| 5,778,941 | 7/1998 | Inada | 138/134 |

*Primary Examiner*—Eric K. Nicholson
*Attorney, Agent, or Firm*—Brian S. Welborn

[57] ABSTRACT

A one piece integrally formed liquid tight connection or "whip" assembly for electrically interconnecting electrical appliances, such as air conditioning units, hot tubs, swimming pools and outdoor lighting fixtures, to one another and/or to a power source junction box or control box. The connection assembly includes a flexible tubular conduit, preferably constructed from a composite of full rigid PVC and flexible plasticized PVC, having first and second end portions and an outer surface with a plurality of surface irregularities. A pair of end fittings are integrally attached to the first and second end portions of the tubular conduit, respectively, using either a solvent welding or temperature welding technique. When using the solvent technique, the plurality of surface irregularities operate to hold additional localized amounts of solvent which further reacts with the plastic in the end fittings and conduit to yield a superior weld. Each of end fitting also includes an external annular seal ring for engaging the electrical devices. A plurality of conductors extend through the tubular conduit and end fittings which provide electrical communication between the electrical devices.

13 Claims, 5 Drawing Sheets

INTEGRALLY FORMED WHIP ASSEMBLY FOR ELECTRICALLY INTERCONNECTING ELECTRICAL APPLIANCES TO A POWER SOURCE

BACKGROUND

The present invention relates generally to an electrical connection apparatus for installing the electrical portions of appliances such as air conditioning condensers, hot tubs, swimming pools and outdoor lighting fixtures. More particularly, the present invention relates to an integrally form weatherproof electrical connection assembly for providing a liquid-tight electrical interconnection between an electrical appliance and power source junction box or a control box, or between one electrical appliance and another.

In the art of installing an electrical appliance, such as air conditioning unit, hot tub, swimming pool and outdoor lighting fixture, it is often necessary to ensure that the resulting connections between the appliance and a power source junction box or similar electrical enclosure, are raintight, i.e., that water, due to beating rain or similar intermittent weather conditions, does not enter the conduit or the junction box through the connector fitting or through connector interface openings in the appliance or junction box. In order to address the above concerns, the connector industry has seen the use of connector assemblies, also known as "whip" assemblies, which typically consist of a flexible conduit, connector fittings on each end of the conduit for attaching the conduit to a panel or enclosure, and conductors inside the conduit to carry power to the appliance. The connector fittings are usually attached to the conduit via a threaded mechanical connection and typically have a straight pipe thread that accepts a secondary sealing device or o-ring. While the known whip assemblies may function for their intended purpose, they suffer from many disadvantages. Internal screw threads on the interior surface of a connector fitting, which facilitates the mechanical attachment of the fitting onto the conduit by engaging the outer surface, can potentially damage the structure and liquid proof integrity of the conduit because the threads may invasively engage the outer surface of the conduit allowing liquid and moisture to enter.

The connector industry has also seen the use of rotatable two piece end fittings. Typically, one piece is rotatably attached to a second piece which, in turn, can be screw inserted into a threaded hole in a junction box. However, at the juncture of the two pieces of this type connector, raintight connection may not be maintained. In order to maintain an effective raintight seal at the juncture of two rotatably coupled members, a sealing ring or similar elastomeric grommet or bushing is needed. Once an elastomeric member is inserted between two coupled parts, their relative mobility is decreased due to frictional engagement and the elastomeric sealing ring may be subject to wear and degradation upon frequent rotation of the parts. Once the sealing ring is damaged or worn, the connector will no longer be liquid tight.

Additionally, in typical applications, the flexible conduit is screw threaded onto a cylindrical body, the screw engagement of the threads of the body with the plastic conduit providing a watertight seal. However, it has been found that connection may be susceptible to flow of low viscosity fluid which may be present in the environment in which these connectors are used.

It is, therefore, desirous to provide a one piece integrally formed liquid proof whip assembly having connector fittings permanently attached to the end of the flexible conduit. There is a further need in the industry for an end fitting which includes an integral sealing ring, for engaging the opening of an appliance or junction box, which would eliminate the need for a secondary sealing apparatus altogether.

SUMMARY

The present invention addresses the above needs by providing a one piece integrally formed liquid tight connection or "whip" assembly for electrically interconnecting electrical appliances, such as air conditioning units, hot tubs, swimming pools and outdoor lighting fixtures, to one another and/or to a power source junction box or control box. The connection assembly includes a flexible tubular conduit, preferably constructed from a composite of full rigid PVC and flexible plasticized PVC, having first and second end portions and an outer surface with a plurality of surface irregularities. A pair of end fittings are integrally attached to the first and second end portions of the tubular conduit, respectively, using either a solvent welding or temperature welding technique. When using the solvent technique, the plurality of surface irregularities operate to hold additional localized amounts of solvent which further reacts with the plastic in the end fittings and conduit to yield a superior liquid tight weld. Each end fitting also includes an external annular seal ring for engaging the electrical devices eliminating the need, burden, expense and disadvantages of a secondary sealing apparatus. A plurality of conductors extend through the tubular conduit and end fittings which provide electrical communication between the electrical devices.

There has thus been outlined, rather broadly, many of the important features of the present invention in order that the detailed description thereof that follows may be better understood, and that the present contribution to the art may be better appreciated. There are, of course, numerous other novel features of the present invention that will become apparent from a study of the drawings and the description which will form the subject matter of the claims appended hereto. Therefore, it is to be understood that the phraseology and terminology employed herein are for the purpose of description and should not be regarded as limiting. As such, those skilled in the art will appreciate that the conception, upon which this disclosure is based, may readily be utilized as a basis for the designing of other connection assemblies and end fittings for carrying out the several purposes of the present invention. It is important, therefore, that the claims be regarded as including such equivalent assemblies and fittings insofar as they do not depart from the spirit and scope of the present invention.

BRIEF DESCRIPTION OF THE DRAWINGS

These and other features, aspects, and advantages of the present invention will become better understood with regard to the following detailed description, appended claims, and accompanying drawings where:

DETAILED DESCRIPTION

Figure 1:
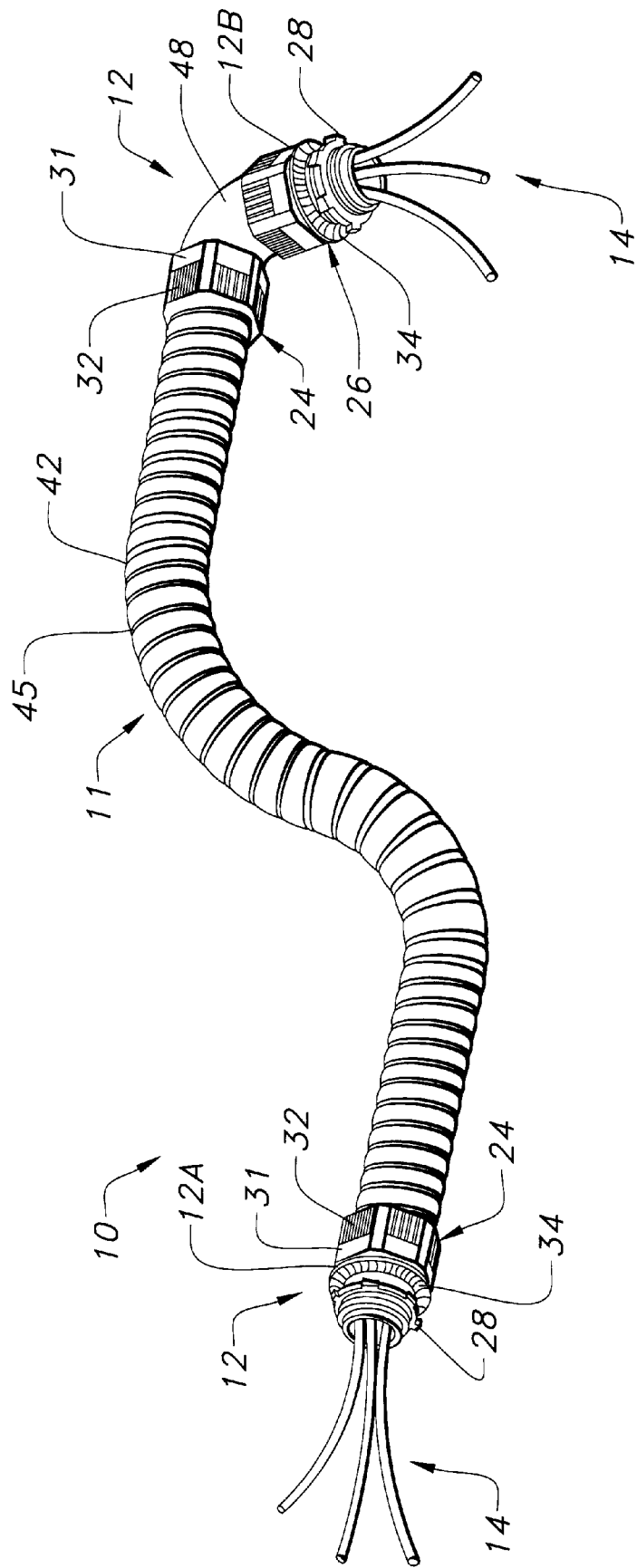
FIG. 1 is a perspective view of a representative integrally formed weatherproof electrical interconnection assembly embodying the features of the present invention.

Referring to the drawings for a clearer understanding of the present invention, FIG. 1 discloses generally at 10 a representative integrally formed electrical connection ("Whip") assembly designed preferably for connecting the electrical portions of an appliance 15 (shown in FIG. 4), such as an air conditioning unit, hot tub, swimming pool and outdoor lighting fixture, to an electrical enclosure (not shown) such as a power source junction box. Whip assembly 10 generally includes a flexible plastic conduit 11 having first 20 and second 13 end portions and at least one end fitting 12 integrally attached to one of the end portions 20 or 13.

One function of the flexible conduit 11 is to provide a liquid proof means for carrying and directing a plurality of conductors 14 from a power source to appliance 15 or from one appliance 15 to another. A corresponding function of end fitting 12 is to facilitate a conventional mechanical attachment of conduit 11 to the electrical appliance 15 or enclosure. It should be understood that the conductors 14 may assume a variety of roles other than transmitting power. For instance, conductors 14 may also be used to transmit electrical signals between the electrical circuitry of more than one appliance 15, or between an appliance 15 and some known type of electronic controller (not shown). In this regard, while the preferred function of the conductors 14 is to conventionally transmit power, they are to be considered representative of more sophisticated alternate uses.

Figure 2:
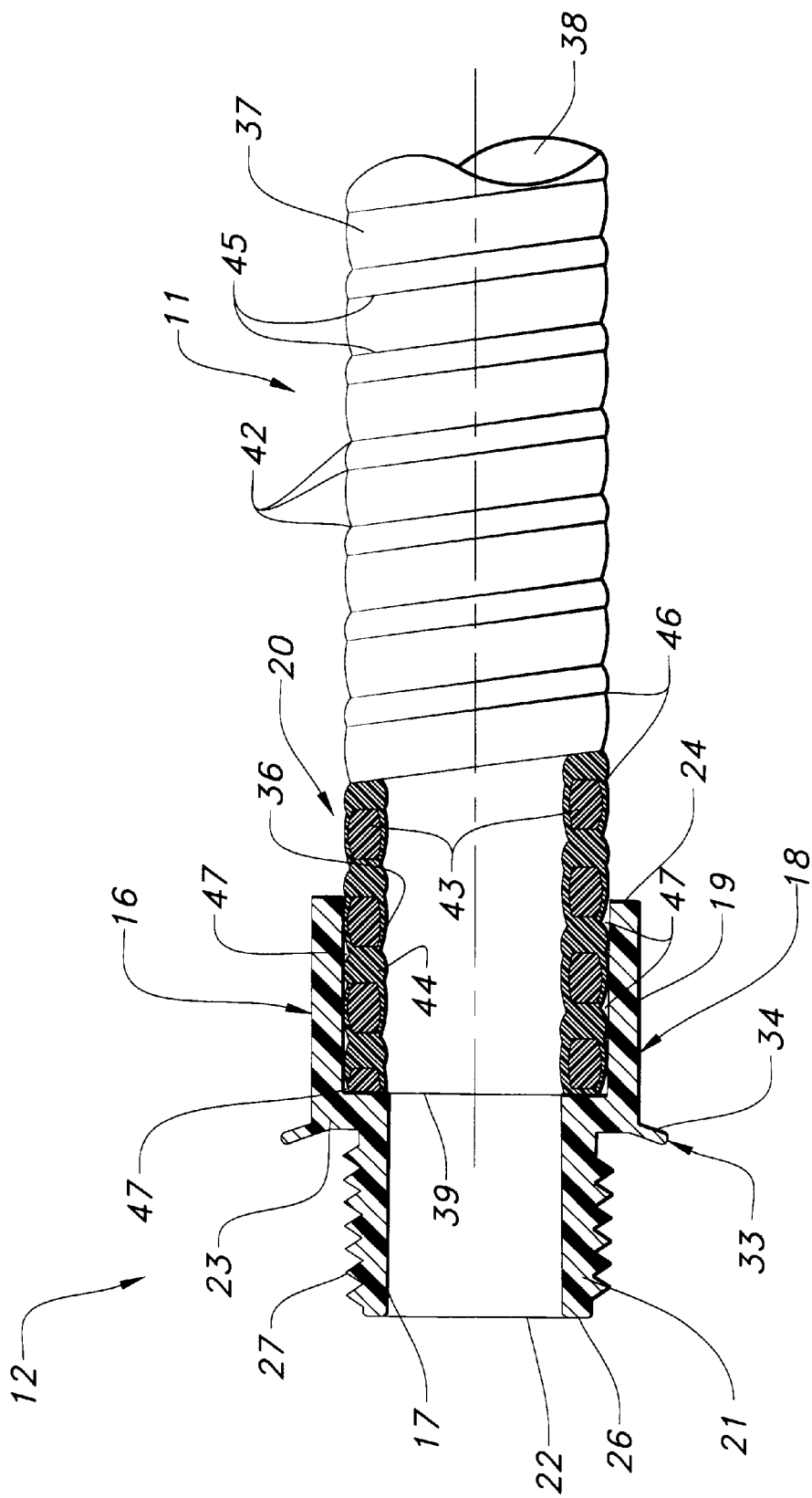
FIG. 2 is a side elevational view, enlarged and partially in section, of an end fitting and flexible conduit embodying the features of the present invention.
Figure 4:
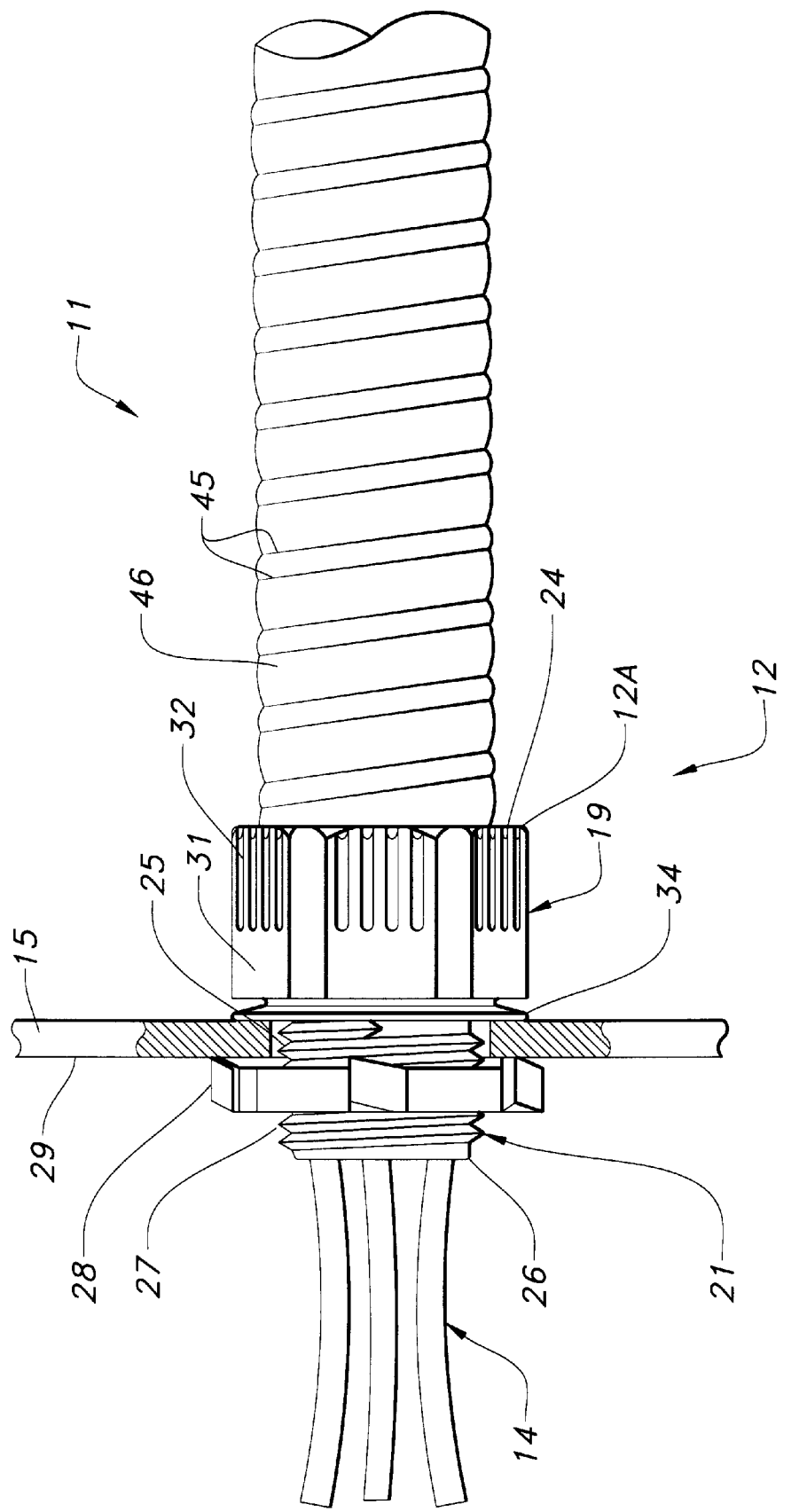
FIG. 4 is an enlarged side elevational view of the end fitting and flexible conduit illustrated in FIG. 2 shown connected to an electrical appliance, partially in section, embodying the features of the present invention.

A preferred embodiment of end fitting 12 is illustrated in FIGS. 1–2 and 4 and designated specifically as end fitting 12a. Referring to FIG. 2, fitting 12a is comprised of a hollow generally cylindrical sidewall 16, having interior 17 and exterior 18 surfaces, integrally formed preferably from plastic, such as full rigid PVC, or other suitable material. Sidewall 16 includes a conduit receiving portion 19 for receiving conduit 11, a connection portion 21 for connection to appliance 15 or other electrical enclosure, and a central bore 22 axially aligned with and in communication with conduit receiving portion 19 and connection portion 21. Sidewall 16 further includes an annular shoulder 23 centrally located between the conduit receiving 19 and connection 21 portions. Annular shoulder 23 may extend substantially perpendicular to sidewall 16. Conduit receiving portion 19 extends longitudinally in the axial direction a suitable distance from annular shoulder 23 to a conduit receiving end 24 while the connection portion 21 extends a suitable distance in the axial direction from annular shoulder 23 to a connection end 26.

The exterior surface 18 of connection portion 21 preferably includes external screw threads 27 for engaging a suitable nut 28, such as a lock nut, which when used together facilitates the conventional mechanical attachment of end fitting 12a to appliance 15 or other electrical enclosure, as shown in FIG. 4. Attachment is achieved by inserting the connection portion 21 of end fitting 12a through a non-threaded opening 25 in the sidewall of appliance 15 until a sufficient length of threaded portion 21 for engaging nut 28 is exposed on the opposite or interior side 29 of the appliance 15 sidewall. Next, nut 28 or other similar conventional securement device is placed on connection portion 21 to operatively engage the external screw threads 27 whereby continued tightening of nut 28 locks or secures end fitting 12a to appliance 15. While the above described attachment method is preferred, other conventional securement means or devices may be utilized such as screw connecting the connection portion 21 into a threaded opening in appliance 15 or other electrical enclosure, by utilizing a more elaborate securement device to engage a nonthreaded connection portion (not shown), or by designing the connection portion to be snap inserted into the opening of appliance 15.

As best illustrated in FIGS. 1 and 4, in order to enhance the preferred method of attaching fitting 12a to appliance 15, the exterior surface 18 of conduit receiving portion 19 may include a plurality of gripping elements 31, each preferably including a plurality of serrations 32 thereon, to provide a secure grip for the installer. In a preferred embodiment, gripping elements 31 are integrally formed into the exterior surface 18 of conduit receiving portion 19 to create a generally hexagonal cross-sectional shape.

End fitting 12a may further include an integral sealing portion 33 for providing a liquid tight seal around the non-threaded opening 25 in the sidewall of appliance 15 or other enclosure. By including the integral sealing portion 33, the present invention eliminates the need, burden, disadvantages and expense of a separate secondary sealing apparatus or o-ring. In a preferred embodiment, as shown in FIGS. 1–2 and 4, sealing portion 33 comprises an external annular seal ring 34 integrally formed by annular shoulder 23. Seal ring 34 preferably extends in a generally radial outward direction from sidewall 16 and in a slightly axial direction toward connection portion 21. In operation, once the connection portion 21 of end fitting 12a is inserted through opening 25 and nut 28 is applied to threads 27, tightening of nut 28 will urge seal ring 34 into contact with appliance 15 so that it sealably engages and conforms to the sidewall of appliance 15 around the non-threaded opening 25 thereby providing a liquid tight seal. Thus, liquid or water due to rain or other circumstances is prevented from entering appliance 15 through opening 25 by seal ring 34. While seal ring 34 is shown as an integral part of shoulder 23, it will be appreciated by one skilled in the art that seal ring 34 may be located at any suitable location along the exterior surface 18 of sidewall 16 depending on the design of fitting 12 and opening 25.

FIGS. 1–4 illustrate a generally tubular flexible conduit 11 having an inner surface 36 and an outer surface 37. The inner surface 36 is generally smooth and preferably has a generally constant diameter which spans the entire length of conduit 11. Inner surface 36 inherently defines a internal passageway 38 for providing continuous communication between first 39 and second 41 ends of first 20 and second 13 end portions, respectively. The smooth inner surface 36 allows conductors 14 to be easily pulled through conduit 11 with minimal resistance. The outer surface 37 of conduit 11, on the other hand, includes a plurality of surface irregularities 42 preferably in the form of helical or spiral grooves 45 giving it an external rifling effect. Even though the external surface irregularities 42 may provide some structural benefit in the attachment of end fitting 12a onto conduit 11, their inclusion in or on outer surface 37, as discussed below in greater detail, is primarily instrumental in providing an improved non-mechanical permanent or integral attachment of end fitting 12a onto flexible conduit 11.

Figure 3:
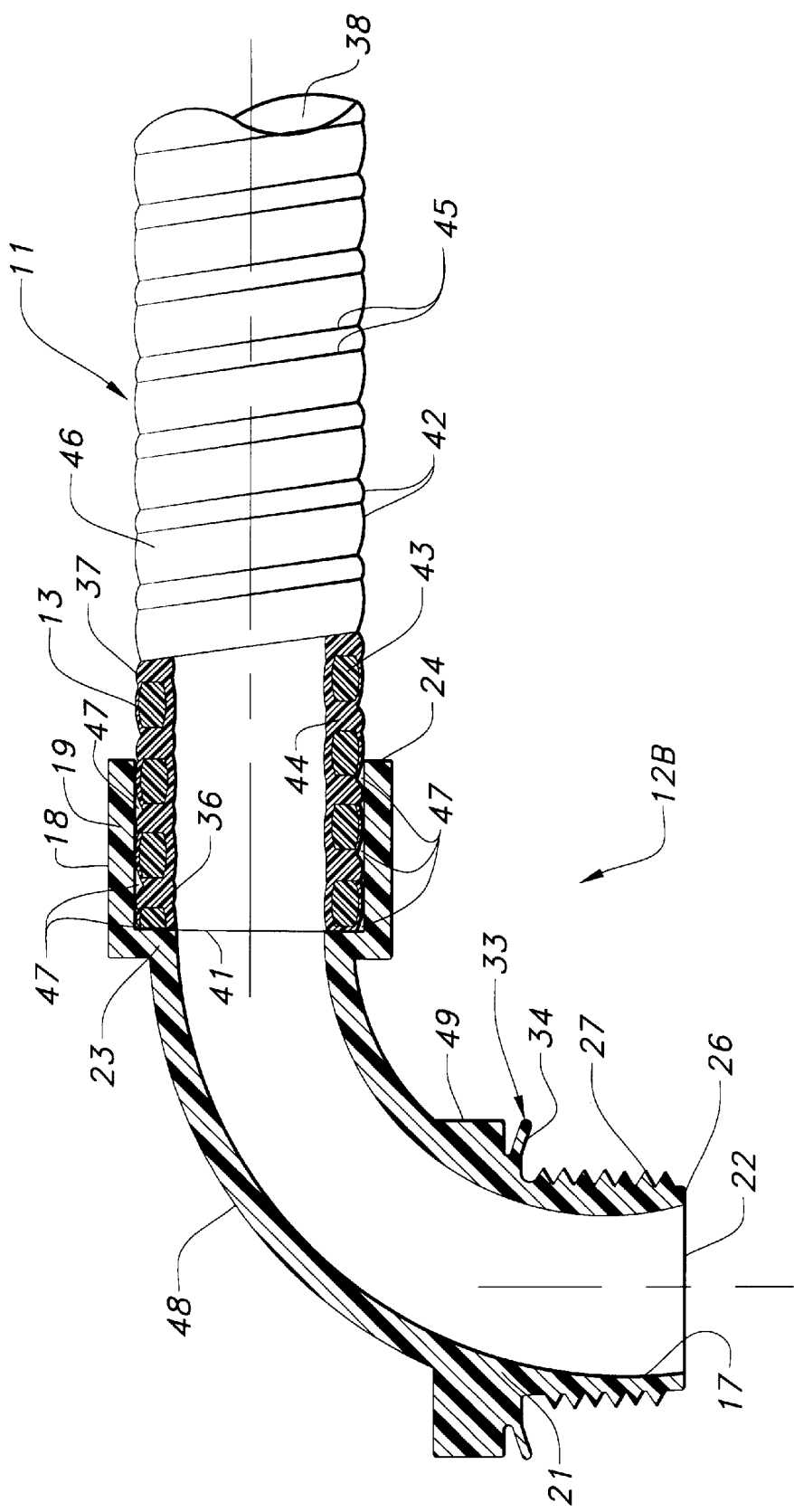
FIG. 3 is a side elevational view, enlarged and partially in section, of a first alternative embodiment of an end fitting and flexible conduit embodying features of the present invention.

Flexible conduit 11 is preferably constructed from a composite of high impact full rigid PVC compound and flexible plasticized PVC. The basic manufacturing technique involves an extrusion process which includes heating high impact full rigid PVC pellets into a liquid state. Under pressure, the liquid melt is pushed through an extrusion die which forms a rigid helical reinforcement core 43, as best shown in FIGS. 2 and 3. A separate liquid melt comprising the flexible plasticized PVC is introduced which fuses with the helical core 43 to form an internal interstitial lining 44, an outer jacket 46 and the smooth inner surface 36. The outer jacket 46 conforms to the helical core 43 to define surface irregularities 42 or spiral grooves 45. A mandrel is used in conjunction with the extrusion die to provide the desired inside (ID) and outside (OD) diameters of conduit 11 which preferably range between approximately 0.622–0.840 inches and 0.820–1.050 inches, respectively. The newly formed extrusion then proceeds through a cooling stage in order to adequately solidify the extrusion for handling. The process is continuous and can produce lengths of conduit 11 up to approximately 100 feet cut and reeled. However, preferable lengths according to the present invention range between approximately 4–6 feet.

One of the many advantages of the present invention over the prior art involves the method of attaching end fitting 12a onto conduit 11. Unlike known mechanical methods of attachment, such as providing internal screw threads on the interior surface of a fitting which invasively engage the outer surface of a flexible conduit potentially damaging its structural and weatherproof integrity, the connection assembly 10 according to the present invention is manufactured as one integral part which reduces cost and enhances its structural and weatherproof integrity. To achieve a one piece integral connection assembly 10, end fitting 12a is integrally attached to flexible conduit 11, thus becoming a permanent entity of conduit 11, using a non-mechanical attaching means such as a solvent (chemical) welding or temperature welding technique. The weld between end fitting 12a and conduit 11 provides a liquid tight seal for preventing water or other liquids from entering connection assembly 10 through the interface of fitting 12a and conduit 11.

Referring to FIG. 2, in order to solvent weld end fitting 12a onto conduit 11, a sufficient amount of a known solvent (not shown) is first applied preferably to the outer surface 37 of first end portion 20 and/or first end 39 of conduit 11. Next, first end portion 20 is inserted into the conduit receiving portion 19 of end fitting 12a preferably until first end 39 seats on the interior surface 17 of annular shoulder 23. The chemical reaction between the solvent and the plastic of outer surface 37 of conduit 11 and interior surface 17 of end fitting 12a permanently welds end fitting 12a onto conduit 11 forming a liquid proof barrier between outer surface 37 and interior surface 17. Alternatively, the solvent may be first applied to the interior surface 17 of conduit receiving portion 19 and/or shoulder 23.

While the above solvent welding technique appears to be conventional in nature, it is not. The diameter of the interior surface 17 of conduit receiving portion 19 is sized to suitably engage the outer surface 37 of first end portion 20. However, the surface irregularities 42 or helical grooves 45 in the outer surface 37 of conduit 11 cooperate with the interior surface 17 of end fitting 12a to define a plurality of interstices 47 therebetween which capture and hold additional amounts of solvent. It has been found that this additional solvent further reacts with the plastic in conduit 11 and end fitting 12a to yield an overall superior weld further enhancing its structural and liquid proof integrity. It should be noted, however, that while a preferred configuration of surface irregularities 42 is shown as helical or spiral grooves 45, a skilled artisan will appreciate that many other suitable design configurations of the external irregularities 42 may suffice to hold additional amounts of solvent.

As mentioned above, the present invention may also utilize a known temperature welding technique to integrally attach end fitting 12a onto conduit 11. Such techniques include ultrasonic welding, friction welding and the direct application of heat. However, regardless of whether a solvent welding or temperature welding technique is used, once end fitting 12a is integrally attached onto conduit 11, the smooth inner surface 36 of conduit 11 and the interior surface 17 of connection portion 21 of end fitting 12a cooperate to define a generally constant or continuous inner surface through assembly 10 which allows conductors 14 to be easily pulled through connection assembly 10 without encountering any structural obstructions or stops as found in, for example, some known types of end fittings. That is, the diameter of inner surface 36 is substantially the same as the diameter of interior surface 17. Moreover, by having a continuous inner surface, connection assembly 10 may fully utilize the cross-sectional area of conduit 11 maximizing the number or size of conductors 14 that may be pulled therethrough.

FIGS. 1 and 3 illustrate a first alternative embodiment of end fitting 12 which is specifically designated as end fitting 12b. The structure of end fitting 12b, as well as its interface with conduit 11, is substantially the same as that described for end fitting 12a, except that end fitting 12b further includes an intermediate curved portion 48 preferably to effectuate a substantially 90° bend or turn between conduit receiving portion 19 and connection portion 21 and an additional annular shoulder 49, which is substantially identical to annular shoulder 23, from which seal ring 34 extends. Curved portion 48 may be constructed from a rigid or flexible plastic material, such as full rigid PVC or flexible plasticized PVC, respectively. Although curved portion 48 is illustrated in FIGS. 1 and 3 as forming a 90° turn, it is recognized that curved portion 48 may be specifically designed to form other shapes.

Figure 5:
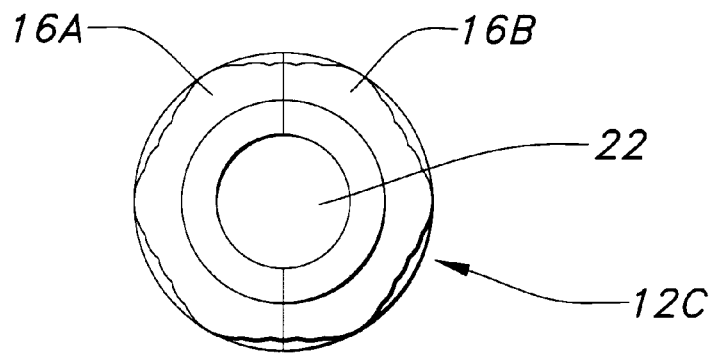
FIG. 5 is a front elevational view of a second alternative embodiment of an end fitting embodying features of the present invention.

FIG. 5 illustrates a second alternative embodiment of end fitting 12 which is designated as end fitting 12c. The overall structure of end fitting 12c is substantially the same as that described for end fitting 12a except that sidewall 16 is formed from two half sections 16a and 16b. Half sections 16a and 16b may be integrally mated with one another using the above described solvent welding or temperature welding techniques. The interface between end fitting 12c and conduit 11 is substantially the same as that described for end fitting 12a except that the method of attachment of end fitting 12c onto conduit 11 may also include simultaneously mating the two half sections 16a and 16b directly onto conduit 11.

Figure 6:
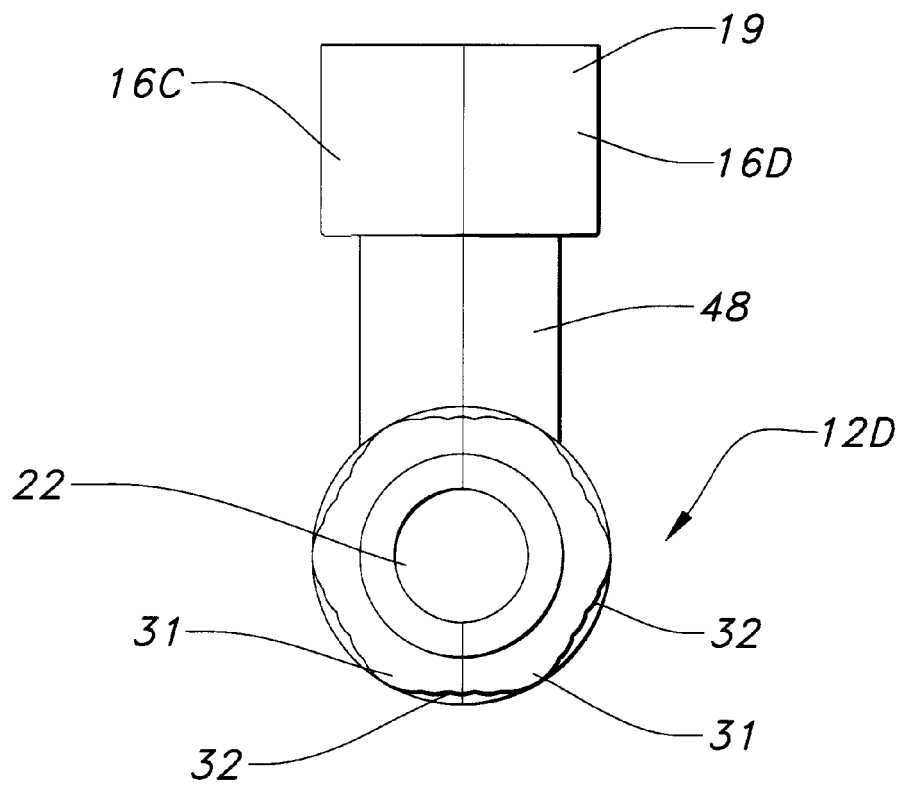
FIG. 6 is a front elevational view of a third alternative embodiment of an end fitting embodying the features of the present invention.

FIG. 6 illustrates a third alternative embodiment of end fitting 12 which is designated as end fitting 12d. The overall structure of end fitting 12d is substantially the same as that described for end fitting 12b except that sidewall 16 is formed from two half sections 16c and 16d. The interface between end fitting 12d and conduit 11 is the same as that described for end fitting 12c.

In the typical installation of an electrical appliance 15, connection assembly 10 preferably utilizes a pair of end fittings 12 located on first 20 and second 13 end portions of conduit 11. In a preferred embodiment, as shown in FIG. 1, connection assembly 10 utilizes two different types of end fittings 12, specifically the types illustrated as end fittings 12a and 12b. It should be understood, however, that the present invention may use any number of combinations of end fittings 12a, 12b, 12c and 12d, either singularly or a pair, with flexible conduit 11.

The present invention also contemplates connection assembly 10 being packaged and sold as a kit of parts for installing electrical appliances. In addition to the structure described above, the kit may further include ties for holding assembly 10 in a wound orientation inside of a container or package and an instruction sheet(s) for providing installation instructions. While a description of the present invention has been provided in detail, such description is for illustrative purposes only.

What is claimed is:

1. A weatherproof connection assembly for electrically connecting an electrical appliance to a power source or one electrical appliance to another, said connection assembly comprising:

(a) a flexible tubular conduit having first and second end portions and an outer surface with surface irregularities, said flexible tubular conduit comprising a generally rigid plastic helical core integrally fused with a plastic flexible interstitial lining, said interstitial lining defining a generally smooth inner surface and an outer jacket, said outer jacket conforming to said helical core to form said surface irregularities; and (b) an end fitting attached to said first end portion of said tubular conduit.

2. A weatherproof connection assembly as defined in claim 1, wherein said connection assembly utilizes a non-mechanical means for integrally attaching said end fitting onto said first end portion of said flexible tubular conduit.

3. A weatherproof connection assembly as defined in claim 2, wherein said non-mechanical means for integrally attaching said end fitting onto said first end portion of said flexible tubular conduit comprises an amount of solvent applied to said outer surface of said first end portion of said tubular conduit sufficient to cover said first end portion and to fill said surface irregularities, said solvent chemically reacting with said end fitting and said tubular conduit integrally welding said fitting onto said conduit.

4. A weatherproof connection assembly as defined in claim 1, wherein said end fitting comprises a hollow generally cylindrical sidewall having a conduit receiving portion for receiving said first end portion of said tubular conduit, a connection portion for connection to said appliance or to said power source, and a central bore axially aligned with and in communication with said conduit receiving portion and said connection portion, said connection portion having an inside diameter substantially equal to the diameter of said inner surface of said tubular conduit so as to form a continuous inner surface through said connection assembly.

5. A weatherproof connection assembly as defined in claim 1, wherein said end fitting includes an integral sealing portion for providing a liquid tight seal around an opening in said appliance or power source.

6. A weatherproof connection assembly as defined in claim 4, wherein said sidewall of said end fitting comprises two half sections integrally welded together and to said tubular conduit using said solvent.

7. A weatherproof connection assembly as defined in claim 4, wherein said connection assembly further comprises a second end fitting integrally attached to said second end portion of said tubular conduit, said second end fitting comprising a hollow generally cylindrical sidewall having a conduit receiving portion for receiving said second end portion of said tubular conduit, a connection portion for connection to said appliance or to said power source, and a central bore in communication with said conduit receiving portion and said connection portion, said connection portion of said second end fitting having an inside diameter substantially equal to the diameter of said inner surface of said tubular conduit so as to form a continuous inner surface through said connection assembly.

8. A weatherproof connection assembly as defined in claim 7, wherein said second end fitting further comprises an intermediate curved portion between said conduit receiving end and said connection end for effectuating a bend in said second end fitting.

9. A whip assembly for connecting the electrical portion of an appliance to a power source or one appliance to another, said whip assembly comprising:

(a) a flexible tubular conduit having first and second end portions with first and second ends, said tubular conduit further having a generally smooth inner surface which defines an internal passageway for providing continuous communication between said first and second ends;

(b) a pair of end fittings integrally attached to said first and second end portions of said tubular conduit, respectively, for engaging said appliance and said power source, said pair of end fittings each including an integral sealing portion for providing a liquid tight seal around respective openings in said appliance and said power source; wherein each of said pair of end fittings comprises a hollow generally cylindrical sidewall having an interior and exterior surface and a centrally located annular shoulder, said sidewall further having a conduit receiving portion for receiving said first and second end portions of said tubular conduit, respectively, and a central bore in communication with said conduit receiving portion and said connection portion, said interior surface of said connection portion having a diameter substantially equal to the diameter of said inner surface of said tubular conduit so as to form a continuous inner surface through said whip assembly; and (c) wherein said whip assembly utilizes a non-mechanical means for integrally attaching said pair of end fittings onto said first and second end portions of said tubular conduit, respectively, said non-mechanical attaching means forming a liquid proof barrier between an outer surface of said first and second end portions of said tubular conduit and said interior surface of said connection portion of said pair of end fittings, respectively.

10. A whip assembly as defined in claim 9, wherein said flexible tubular conduit comprises a generally rigid plastic helical core integrally fused with a flexible plastic interstitial lining, said interstitial lining defining said generally smooth inner surface and an outer jacket, said outer jacket conforming to said helical core to form a plurality of spiral grooves.

11. A whip assembly as defined in claim 10, wherein said non-mechanical means for integrally attaching said pair of end fittings onto said first and second end portions of said tubular conduit comprises an amount of solvent applied to said outer surface of said first and second end portions of said tubular conduit sufficient to cover said first and second end portions and to fill said plurality of spiral grooves, said solvent chemically reacting with said tubular conduit and said pair of end fittings thereby permanently welding said pair of end fittings onto said first and second end portions of said tubular conduit, respectively.

12. A whip assembly as defined in claim 11, wherein said sidewall of pair of end fittings comprises two half sections integrally welded together and to said first and second end portions of said tubular conduit, respectively.

13. A whip assembly as defined in claim 11, wherein one of said pair of end fittings further comprises an intermediate curved portion between said conduit receiving end and said connection end for effectuating a substantially 90° bend in said one of said pair of end fittings.

* * * * *